(12) United States Patent
Kamini et al.

(10) Patent No.: US 10,410,426 B2
(45) Date of Patent: Sep. 10, 2019

(54) AUGMENTED REALITY VEHICLE USER INTERFACE

(71) Applicant: GM GLOBAL TECHNOLOGY OPERATIONS LLC, Detroit, MI (US)

(72) Inventors: Aditya S. Kamini, Bloomfield Hills, MI (US); Nathaniel H. Williams, Berkley, MI (US); Richard Elswick, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/847,433

(22) Filed: Dec. 19, 2017

(65) Prior Publication Data

US 2019/0188912 A1    Jun. 20, 2019

(51) Int. Cl.
| | |
|---|---|
| *G06K 9/00* | (2006.01) |
| *G08B 21/00* | (2006.01) |
| *B60W 30/18* | (2012.01) |
| *G06T 19/00* | (2011.01) |
| *G09G 5/36* | (2006.01) |
| *G06F 3/044* | (2006.01) |
| *G06F 3/01* | (2006.01) |

(52) U.S. Cl.
CPC ............ *G06T 19/006* (2013.01); *G06F 3/017* (2013.01); *G06F 3/044* (2013.01); *G09G 5/363* (2013.01); *G09G 2340/12* (2013.01); *G09G 2354/00* (2013.01); *G09G 2370/16* (2013.01); *G09G 2380/10* (2013.01)

(58) Field of Classification Search
CPC ... G06T 19/006; G06F 3/017; G09G 2380/10; G09G 2340/12; H04W 4/008; H04M 1/7253
See application file for complete search history.

(56) References Cited

U.S. PATENT DOCUMENTS

| | | | |
|---|---|---|---|
| 9,019,128 B1 * | 4/2015 | Kim ....................... | G01C 23/00 340/945 |
| 2012/0183137 A1 * | 7/2012 | Laughlin ................ | H04N 7/185 380/200 |
| 2013/0005319 A1 * | 1/2013 | Sakata .................... | H04W 4/40 455/418 |
| 2013/0069985 A1 * | 3/2013 | Wong ................... | G02B 27/017 345/633 |
| 2015/0347850 A1 * | 12/2015 | Berelejis ............ | G06K 9/00671 345/633 |

(Continued)

*Primary Examiner* — Samantha (Yuehan) Wang
(74) *Attorney, Agent, or Firm* — Reising Ethington P.C.; David Willoughby (57) ABSTRACT

A system and method of operating a vehicle using virtual vehicle controls, wherein the method includes: capturing image or video data from an area within an interior of the vehicle; sending a virtual vehicle control graphics request to a vehicle; receiving virtual vehicle control graphics response from the vehicle, wherein the virtual vehicle control graphics response includes virtual vehicle control graphics; and presenting the captured image or video data and the virtual vehicle control graphics on a display of the AR/VR device such that the virtual vehicle control graphics are presented over the captured image or video data, wherein the virtual vehicle control graphics includes one or more vehicle-user interface components.

17 Claims, 3 Drawing Sheets

(56) References Cited

U.S. PATENT DOCUMENTS

2015/0379793 A1* 12/2015 Murakami .............. B60R 25/24
340/5.61
2016/0227009 A1* 8/2016 Kim ....................... B60K 35/00
2018/0105185 A1* 4/2018 Watanabe .......... G06K 9/00288

* cited by examiner

Figure 1

AUGMENTED REALITY VEHICLE USER INTERFACE

INTRODUCTION

The present invention relates to using augmented reality/virtual reality (AR/VR) devices to present a virtual vehicle skin over images depicting a vehicle.

Vehicles include hardware and software capable of various multimedia functions, including playing audio received from radio stations, mobile devices (e.g., smartphones, tablets), many of which utilize wireless communications, such as short-range wireless communications (SRWC). Additionally, vehicles include numerous vehicle system modules (VSMs) that can be used to provide information to other electronic computing devices, such as personal mobile devices.

SUMMARY

According to one aspect of the invention, there is provided a method of operating a vehicle using virtual vehicle controls, wherein the method includes: capturing image or video data from an area within an interior of the vehicle; sending a virtual vehicle control graphics request to a vehicle; receiving virtual vehicle control graphics response from the vehicle, wherein the virtual vehicle control graphics response includes virtual vehicle control graphics; and presenting the captured image or video data and the virtual vehicle control graphics on a display of the AR/VR device such that the virtual vehicle control graphics are presented over the captured image or video data, wherein the virtual vehicle control graphics includes one or more vehicle-user interface components.

According to various embodiments, this method may further include any one of the following features or any technically-feasible combination of these features:

the captured image or video data is captured by a camera located on the AR/VR device, and wherein the camera of the AR/VR device faces an area in front of a user when the display of the AR/VR device is positioned to face the user;

the AR/VR device is a pair of AR/VR goggles configured for visually presenting augmented reality or virtual reality media content to a user and that are wearable by the user and, when the AR/VR device is worn properly by the user, the display of the AR/VR device faces the user and the camera of the AR/VR device captures an area in front of the user;

receiving a virtual vehicle control graphics advertisement that indicates virtual vehicle control graphics are available for use by the AR/VR device;

establishing a connection between the AR/VR device and a wireless communications device included in vehicle electronics of the vehicle using Bluetooth™, Wi-Fi™, or other IEEE 802.11 technology, and wherein the virtual vehicle control graphics are received via the established connection;

the virtual vehicle control graphics response includes virtual vehicle control graphics location information that indicates a vehicle component that the virtual vehicle control graphics are to be displayed on or that indicates a location on the display of the AR/VR device where the virtual vehicle control graphics are to be displayed;

receiving vehicle control input from a user at the AR/VR device, and sending the vehicle control input to the vehicle, wherein the vehicle is configured to carry out one or more actions based on the vehicle control input;

receiving a second virtual vehicle control graphics response from the vehicle after sending the vehicle control input to the vehicle, and wherein the second virtual vehicle control graphics includes updated virtual vehicle control graphics, and presenting the updated virtual vehicle control graphics on the display of the AR/VR device; and/or the virtual vehicle control graphics are updated based on the vehicle control input.

According to another aspect of the invention, there is provided a method of controlling a vehicle using virtual vehicle controls, wherein the method includes: establishing a short-range wireless communications (SRWC) connection to an augmented reality/virtual reality (AR/VR) device, wherein the AR/VR device includes a display and a camera, wherein the AR/VR device is configured to capture image or video data, and wherein the AR/VR device includes short-range wireless communication (SRWC) circuitry that is used to send and receive SRWC signals; receiving a virtual vehicle control graphics request from the AR/VR device; determining whether the AR/VR device is authorized and/or authenticated for receiving and/or using virtual vehicle control graphics; sending virtual vehicle control graphics response to the AR/VR device via the established SRWC connection, wherein the AR/VR device is further configured to present the virtual vehicle control graphics on the display of the AR/VR device such that the virtual vehicle control graphics are presented over the captured image or video data, wherein the virtual vehicle control graphics includes one or more vehicle-user interface components; and receiving vehicle control input from a user of the AR/VR device.

According to various embodiments, this method may further include any one of the following features or any technically-feasible combination of these features:

the virtual vehicle control graphics response includes virtual vehicle control graphics location information that indicates a vehicle component that the virtual vehicle control graphics are to be displayed on or that indicates a location within the display of the AR/VR device where the virtual vehicle control graphics are to be displayed;

the vehicle component corresponds to a capacitive touch sensor array included in vehicle electronics of the vehicle, wherein the receiving step further includes receiving sensor location input from the capacitive touch sensor array, and wherein the sensor location input indicates a location within the capacitive touch sensor array that is touched by the user;

the vehicle control input indicates a selection or modification of the one or more vehicle-user interface components, and wherein the selection or modification is determined based on the sensor location input;

the vehicle control input is received from the AR/VR device;

the vehicle control input is initially received at the AR/VR device using a controller of the AR/VR device;

the vehicle control input is initially received at the camera of the AR/VR device, and wherein the vehicle control input is communicated by the user to the AR/VR device via one or more gestures created by the user in a field of view of the camera;

authorizing the vehicle control input based on authorization information contained within the vehicle control input and/or information contained in the virtual vehicle control graphics request;

modifying operation of one or more vehicle system modules (VSMs) in response to receiving the vehicle control input and wherein the modifying step is based on the vehicle control input;

after modifying operation of one or more vehicle system modules (VSMs), sending a vehicle control input response that includes information used for rendering updated virtual vehicle control graphics; and/or the information used for rendering the updated virtual vehicle control graphics includes an instance of the updated virtual vehicle control graphics, and wherein the updated virtual vehicle control graphics are generated at the vehicle based on the vehicle control input and/or the modified operation of the one or more VSMs.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables an augmented reality/virtual reality (AR/VR) device to render virtual vehicle controls on a video or image such that the virtual vehicle controls are presented over an area corresponding to a vehicle or a vehicle component. AR/VR devices can use camera(s) to capture an image or video of an area surrounding a user and, then, can render graphics over certain parts of the captured image or video for presentation on a display of the AR/VR device. In this way, the AR/VR device can display graphics over real-life images or video of a user's surroundings such that the graphics supplement the user's visual perception of the surrounding environment, which can provide aesthetically pleasing graphics, as well as information to the user. And, in many embodiments, the graphics can be used to present virtual vehicle controls that a user may interact with so as to adjust vehicle settings, such as temperature or climate control settings and multimedia control settings.

For example, virtual vehicle graphics can be developed and displayed by AR/VR devices in conjunction with video or images of the user's environment to provide an augmented reality (AR) view. AR/VR devices can use a camera that, when worn by a user, faces an area in front of the user (the "AR/VR device field of view"). In one embodiment, the AR/VR device is a pair of AR or VR goggles that are configured to fit around a user's head and that includes a display that, when the goggles are properly worn, is positioned in front of the user's eyes or field of vision. The AR/VR device can download virtual vehicle control graphics that are associated with the vehicle and, subsequently, the AR/VR device can display the virtual vehicle control graphics on captured image or video in an area corresponding to the vehicle or a particular component of the vehicle. In many embodiments, the method and system discussed below can be used to augment an area within the interior of the vehicle, such as within an interior vehicle cabin.

In some embodiments, virtual vehicle control graphics can be developed based on a layout or design of a particular vehicle and, then, the virtual vehicle control graphics can be sent to AR/VR devices at or near the vehicle so that the AR/VR devices can display the virtual vehicle control graphics over the vehicle. Since the virtual vehicle control graphics correspond to a layout of the vehicle, the virtual vehicle control graphics can be presented at areas within the vehicle that are convenient for displaying user interfaces, such as single- and/or light-colored surfaces. As illustrated below, virtual vehicle control graphics can be presented over an area of the backside of a vehicle seat. This backside of the vehicle seat, which the virtual vehicle control graphics are presented over, can include a capacitive touch sensor array that detects when a user touches the seat, as well as the location of where the user touched the seat. The vehicle can also have virtual vehicle control information stored in memory that includes information representing where various controls are within the virtual vehicle control graphics. Through using this virtual vehicle control information, along with the location of the user's touch, the vehicle can determine which vehicle controls are being adjusted (or touched) by a user and, accordingly, the vehicle can adjust the corresponding vehicle settings.

Figure 1:
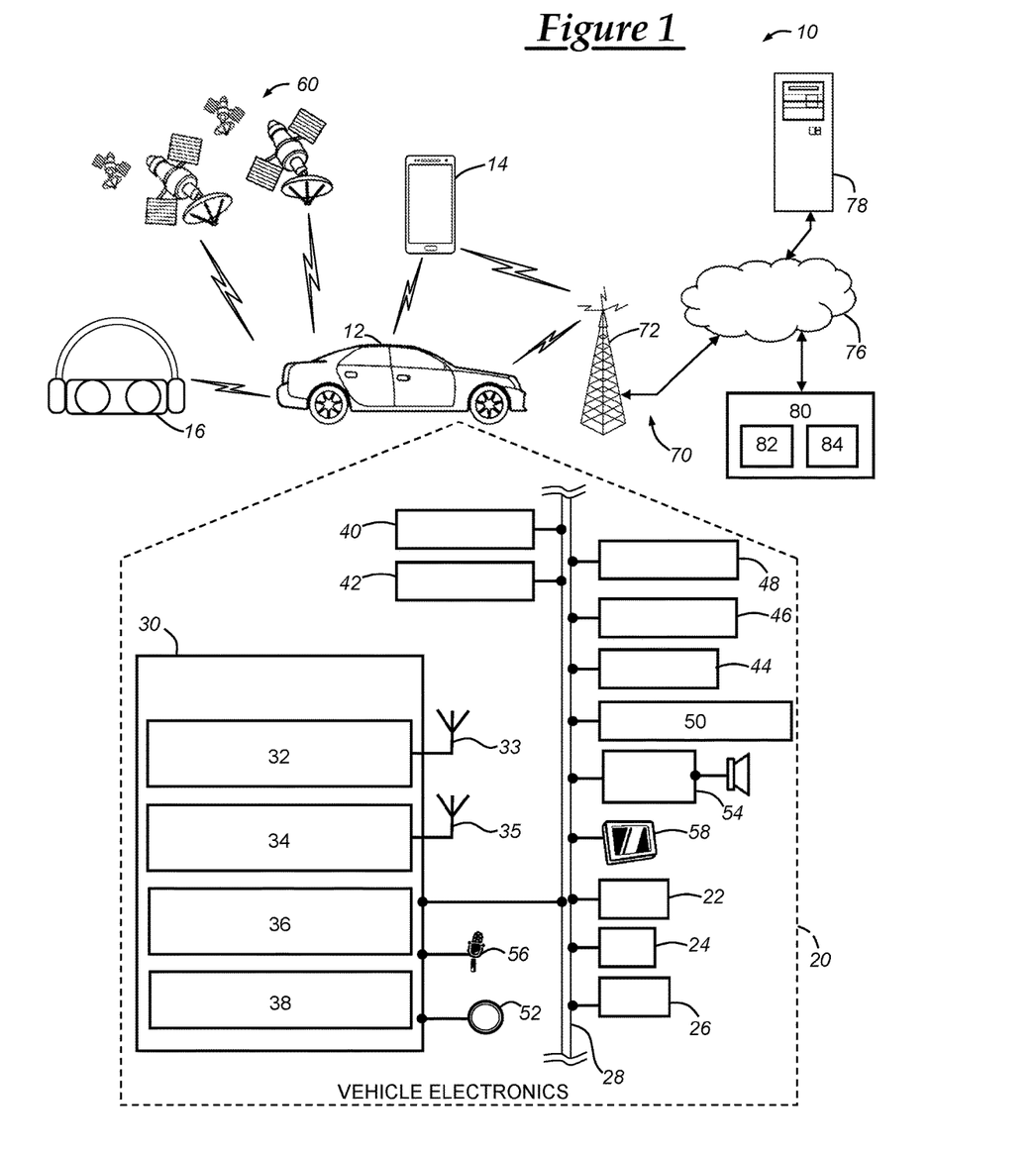
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and VSMs 22-58, augmented reality/virtual reality (AR/VR) devices 14 and 16, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as for purchasing or selecting skins or designs for use with the virtual vehicle control graphics that are presented using an AR/VR device. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12. In one embodiment, computers 78 can be used to carry out the method discussed herein; in other embodiments, the method can be carried out by servers or other computing devices at remote facility 80, as discussed more below; and, it yet another embodiment, the method can be carried out by a combination of computers 78 and servers at remote facility 80.

Remote facility 80 may be designed to provide the vehicle electronics 20 and/or AR/VR devices 14,16 with a number of different system back-end functions through use of one or more electronic servers and, in many cases, may be a vehicle backend services facility that provides vehicle-related back-end functionality. The remote facility 80 includes servers (vehicle backend services servers) 82 and databases 84, which may be stored on a plurality of memory devices. Also, remote facility 80 can include one or more switches, live advisors, an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware programs stored in the memory (e.g., EEPROM, RAM, ROM), which enable the servers 82 to provide a wide variety of services. For instance, the at least one processor can execute programs or process data to carry out at least a part of the method discussed herein. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70. In one embodiment, servers 82 include an application that carries out at least some of the method illustrated below in FIG. 2.

Databases 84 can be stored on a plurality of memory, such as RAM, other temporary powered memory, any non-transitory computer-readable medium (e.g., EEPROM), or any other electronic computer medium that stores some or all of the software needed to carry out the various external device functions discussed herein. Also, one or more databases 84 at the remote facility 80 can store account information, as well as virtual vehicle control graphics. Also, a vehicle information database can be included that stores information pertaining to one or more vehicles, such as vehicle identification numbers (VINs), virtual vehicle control graphics, virtual vehicle control graphic identifiers and other information, vehicle layout types or features, as well as various other data pertaining to the vehicle. The vehicle layout types or features can indicate general layout of the vehicle or certain vehicle components, and may correspond to a model-year (e.g., 2018 Cruze®). Moreover, particular features of a particular vehicle can be stored in databases 84, such as whether the particular vehicle includes one or more optional features.

Smartphone 14 is an augmented reality/virtual reality (AR/VR) device that is capable of presenting media content to a user on a display. As used herein, "AR/VR device" refers to those devices that are configured to obtain and present AR/VR media content and that include suitable hardware and processing capabilities for presenting AR/VR media content. Non-limiting examples of media control devices are a smartphone, personal computer (PC), laptop, tablet, smart television, and AR/VR goggles or displays. In some embodiments, the smartphone (media control device) 14 may include: hardware, software, and/or firmware enabling cellular telecommunications and short-range wireless communications (SRWC) as well as other mobile device applications. As used herein, a personal AR/VR device is an AR/VR device that is portable by a user and where the portability of the device is at least partly dependent on the user, such as a wearable device (e.g., a smartwatch, AR/VR goggles), an implantable device, or a handheld device (e.g., a smartphone, a tablet, a laptop). And, as used herein, a short-range wireless communications (SRWC) device is a device capable of SRWC and that includes the requisite SRWC circuitry to perform such SRWC.

In many embodiments, the hardware of the AR/VR devices, including smartphone 14, may comprise a processor and memory (e.g., non-transitory computer readable medium configured to operate with the processor) for storing the software, firmware, etc. In one embodiment, the AR/VR devices can include a SRWC circuit, such as the one discussed below with respect to wireless communications device 30 of vehicle 12. The AR/VR device's processor and memory may enable various software applications, which may be preinstalled or installed by the user (or manufacturer) (e.g., having a software application or graphical user interface (GUI)). One implementation of an AR/VR device application may enable the AR/VR device (e.g., smartphone 14) to receive media content and virtual vehicle control graphics via land network 76 and/or cellular carrier system 70, and to play or otherwise present the media content and control graphics to a user via one or more user-device interfaces at the AR/VR device. In one embodiment, AR/VR device 14 may include a display that can be used to visually present media content to a user and may include an audio system that can be used to audibly present media content to a user. Additionally, the AR/VR device 14 can include a digital camera that is configured to capture images and/or video of an area surrounding the AR/VR device. Other playback components or devices can be included and/or controlled by the AR/VR device 14, such as a tactile or haptic device.

In some embodiments, a visual display head mount can be used in conjunction with AR/VR device (e.g., smartphone 14) to mount the device in front of the user's field of vision, as well as enclosing the peripheral field of view of the user. The visual display head mount can be a separately sold and manufactured device that includes a slot or that is otherwise configured for holding AR/VR devices in an orientation such that, when the device is placed within the slot (or otherwise attached to the visual display head mount) and worn properly by the user, the display of the AR/VR device is within the user's field of vision. Moreover, the AR/VR device can include a digital camera that, when the AR/VR device is held up to a user's field of view, captures images or video of an area in front of the user. The captured images and/or video can be presented on the display of the AR/VR device, along with other graphics including the virtual vehicle control graphics. Such a visual display head mount that is used in conjunction with a suitable AR/VR device can be used to transform an ordinary AR/VR device (e.g., smartphone) into a pair of AR/VR goggles. As those skilled in the art will appreciate, even though AR/VR headsets may be referred to as a pair of goggles, only a single display is required, rather than a pair of displays as the name may ostensibly imply.

The pair of Augmented Reality/Virtual Reality (AR/VR) goggles 16 is an AR/VR device that can be used to obtain, process, and present audiovisual content to a user, such as virtual vehicle control graphics. The pair of AR/VR goggles 16 is a head-mounted display that includes a processor and memory, as well as computer instructions (e.g., software, firmware) that enables AR/VR media content to be displayed. And, in some embodiments, the AR/VR goggles 16 can be an AR/VR headset that is manufactured to include AR/VR goggles integrated with a head mount and that includes an audio speaker. The AR/VR goggles 16 can also include other components, such as a SRWC circuit (similar to SRWC circuit 32 discussed below), an accelerometer (or orientation sensors), one or more cameras or other lens capable of receiving and digitizing light signals, a battery, speakers or headphones for presenting audio content, and various other hardware or software components. The AR/VR goggles can be configured for use with applications developed according to a software development kit (SDK) that is configured specifically for AR/VR devices, or that can support AR/VR functionality.

Additionally, as mentioned above, the AR/VR goggles can include speakers or headphones that can present audio content to the user via soundwaves. Such audio content may be a part of audiovisual media content, and the audio and video output of the AR/VR goggles can be synced. In other embodiments, the AR/VR goggles may only include a video output and may connect with other user-device interfaces, such as those included in the vehicle, to output the audio content. And, as will be discussed in more detail below, the AR/VR goggles can present virtual vehicle control graphics.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, body control unit (BCM) 24, other vehicle system modules (VSMs) 26, a wireless communications device 30, seat heaters 40, seat air conditioning devices 42, heating/ventilation/air conditioning system 44, seat motors 46, interior lights 48, and vehicle-user interfaces 50-58. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, BCM 24, wireless communications device 30, temperature control modules 40-44, seat motors 46, interior lights 48, and vehicle-user interfaces 52-58, as will be described in detail below. The vehicle 12 can also include other VSMs 26 in the form of electronic hardware components that are located throughout the vehicle and, which may receive input from one or more sensors and use the sensed input to perform diagnostic, monitoring, control, reporting, and/or other functions. Each of the VSMs 26 is preferably connected by communications bus 28 to the other VSMs, as well as to the wireless communications device 30, and can be programmed to run vehicle system and subsystem diagnostic tests. One or more VSMs 26 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC) and/or via cellular network communications. In the illustrated embodiment, wireless communications device 30 includes an SRWC circuit 32, a cellular chipset 34, a processor 36, memory 38, and antennas 40 and 50. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In other embodiments, the cellular chipset 34 may be incorporated into another VSM, such as a separate telematics unit.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include RAM, other temporary powered memory, any non-transitory computer-readable medium (e.g., EEPROM), or any other electronic computer medium that stores some or all of the software needed to carry out the various external device functions discussed herein. Similar components to those previously described (processor 36 and/or memory 38, as well as SRWC circuit 32 and cellular chipset 34) can be included in AR/VR devices 14 and/or 16.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a body control module or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as AR/VR devices 14,16. A connection between the wireless communications device 30 and one or more devices 14,16 may allow for the operation of various vehicle-device functionality. Vehicle-device functionality (or function) refers to any function of the vehicle that may be complimented, improved, supported, or carried out through a AR/VR device; any function of the AR/VR device that may be complimented, improved, supported, or carried out through the vehicle; or any other function that may be carried out using the vehicle and one or more AR/VR devices. For example, vehicle-device functionality can include using the AR/VR device 14 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the AR/VR device with hands-free calling, such as through use of vehicle-user interfaces to place, receive, and carry out voice calls; sending information to the AR/VR device, such as geographical information to the AR/VR device 14 (such as information obtained from the GPS module 22) or vehicle diagnostic information or codes; and carrying out commands (e.g., commands to perform certain vehicle functions) received at the vehicle from the personal content playback device. And, as discussed in detail below, an established SRWC connection between the AR/VR device and the vehicle can be used to send virtual vehicle control graphics, as well as virtual vehicle control information (including virtual vehicle control input information) between the vehicle and the AR/VR device.

The wireless communications device 30 may be configured to listen for one or more wireless signals, such as those that may be sent by AR/VR device 14. In one embodiment, wireless communications device 30 may receive a connection request message from AR/VR device 14 or 16. Thereafter, the wireless communications device 30 can establish a SRWC connection with the requesting device via a four-way handshake and/or other connection establishment processes, such as those that establish a shared secret or one or more digital keys or other credentials used for securing the SRWC connection.

In one embodiment, wireless communications device 30 may be set to a discovery mode when the vehicle is switched to a powered on state. As used herein, a discovery mode is an operating mode for a SRWC device in which the SRWC device sends out wireless messages that typically are intended to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scanable undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement). This advertisement can be a generic message looking for other SRWC devices to connect to, or this advertisement could be a virtual vehicle control graphics advertisement message that includes information indicating that virtual vehicle control graphics are available for use with AR/VR devices. In other embodiments, a wired communication connection can be established between AR/VR devices 14,16 and the vehicle, such as through using Universal Serial Bus (USB) cables and drivers included on the respective devices.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 28 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display and can be used to provide a multitude of input and output functions. Display 58 can be a touch screen on the instrument panel, a heads-up display reflected off of the windshield, or a projector that can project graphics for viewing by a vehicle occupant. Various other vehicle user interfaces can also be utilized, as the interfaces of FIG. 1 are only an example of one particular implementation.

Body control module (BCM) 24 is shown in the exemplary embodiment of FIG. 1 as being electrically coupled to communication bus 28. In some embodiments, the BCM 24 may be integrated with or part of a center stack module (CSM) and/or integrated with wireless communications device 30. Or, the BCM may be a separate device that is connected to one another via bus 28. BCM 24 can include a processor and/or memory, which can be similar to processor 36 and memory 38 of wireless communications device 30, as discussed below. BCM 24 may communicate with wireless device 30 and/or one or more vehicle system modules, such as an engine control unit (ECU) (not shown), audio system 54, or other VSMs 26. BCM 24 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. For example, BCM 24 can send signals to seat heaters 40, seat AC devices 42, HVAC 44, interior lights 48, and/or seat motors 46. BCM 24 may receive data from the wireless communications device 30 and, subsequently, send the data to one or more vehicle modules.

Additionally, BCM 26 may provide vehicle state information corresponding to the vehicle state or of certain vehicle components or systems. For example, the BCM may provide the device 30 with information indicating whether the vehicle's ignition is turned on, the gear the vehicle is presently in (i.e. gear state), and/or other information regarding the vehicle. The BCM 26 can obtain information from one or more other vehicle modules to obtain this information.

Capacitive touch sensor array 50 is a vehicle system module (VSM) that includes a two-dimensional array of capacitive touch sensors that can determine when a user has touched and/or altered the capacitance of the touch sensors. In other embodiments, other touch sensor arrays can be used, such as resistance touch sensor arrays that can detect a user's touch. The capacitive touch sensor array includes a plurality of capacitive touch sensor input units that include at least one capacitor and an insulator. In one embodiment, when a user places their finger on the capacitive touch sensor array, the capacitance of one or more capacitors may change thereby indicating which capacitive touch sensor input unit(s) the user touched. By determining which capacitive touch sensor input unit(s) the user touched, the vehicle 12 or capacitive touch sensor array 50 can determine where the user touched.

Vehicle electronics 20 also includes numerous other VSMs 40-48,52-58 that can be automatically controlled by the vehicle or that can be controlled via user input, such as that which can be received from use of virtual vehicle control graphics. Temperature control modules 40-44 include VSMs that are included as a part of the vehicle electronics 20 and that can be used to control the temperature or climate inside the vehicle, such as within an interior cabin of the vehicle. Seat heaters 40 and/or seat air conditioning (AC) device 42 can be coupled to a backrest and/or bed of the seat. These devices can provide heating and/or air conditioning to these regions of the seat. Additionally, the vehicle can include a HVAC (heating/ventilation/AC) (or climate control) system that can be used to control the ambient air temperature inside the cabin of the vehicle. Such a system can include an air conditioning (AC) unit or device that cools the interior air of the vehicle, a vehicle heating system that heats the interior air of the vehicle, and a ventilation system including blower fans that can provide ventilation as well as conduits for the cooled and/or heated air.

Figure 3:
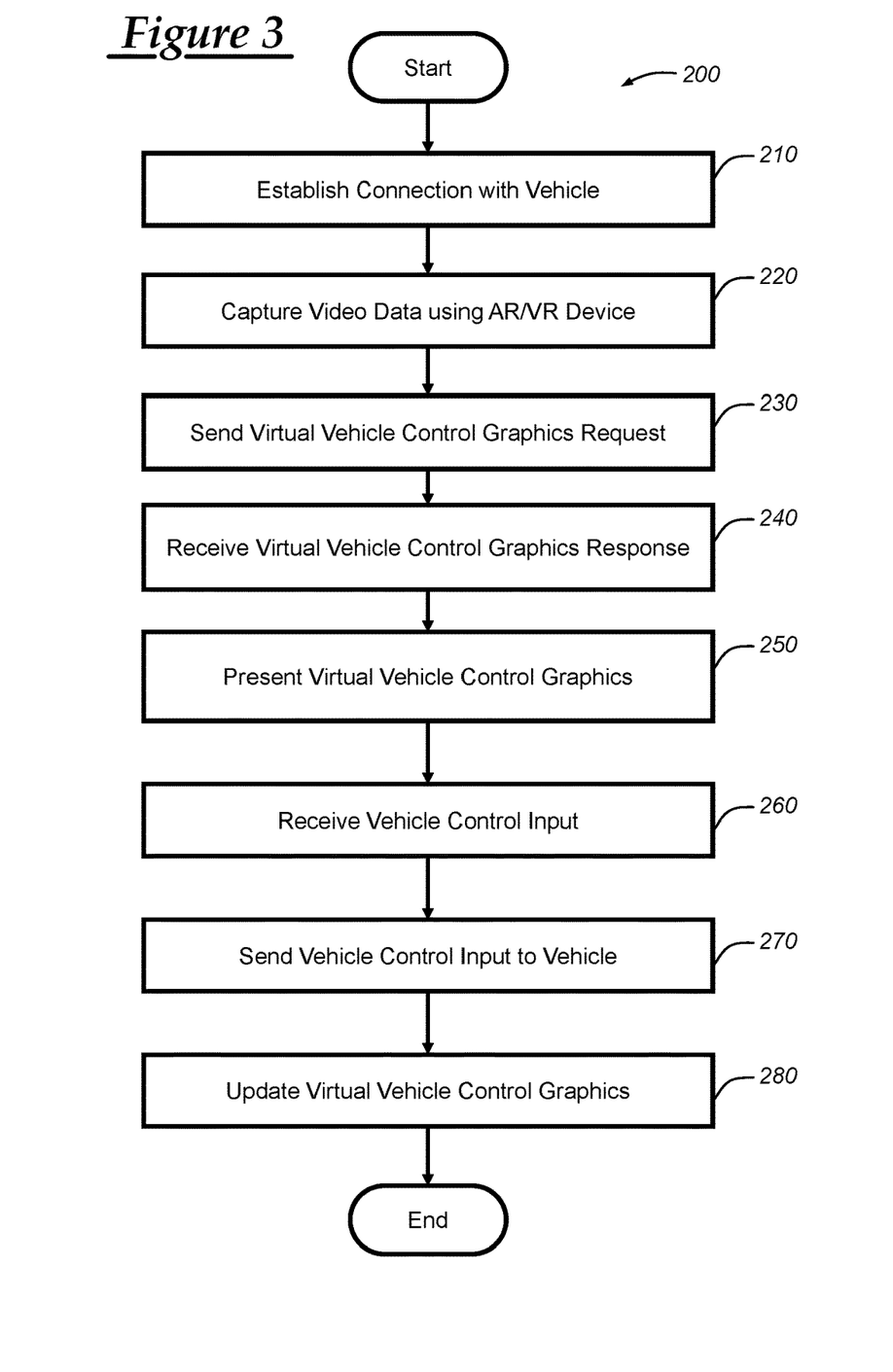
FIG. 3 is a flowchart of an embodiment of a method of operating a vehicle using virtual vehicle controls.

Additionally, vehicle electronics 20 can include interior lights 48 that can be used to provide lighting to one or more areas within the vehicle cabin. Interior lights 48 can be light emitting diodes that are controllable by another VSM, such as an infotainment unit included in the vehicle, and may be operable to transmit light of varying colors and intensities, as well as at different times. Power seat motors 46 can be automatically controlled by one or more vehicle systems (such as BCM 24) and can be used to adjust the position, height, inclination of the seatback, and/or other seat position or orientation properties. Power seat motors 46 can also be controlled through use of one or more manual switches included within the vehicle cabin. Various other types of VSMs can be included in system 10 and used below with the method 200 (FIG. 3).

Figure 2:
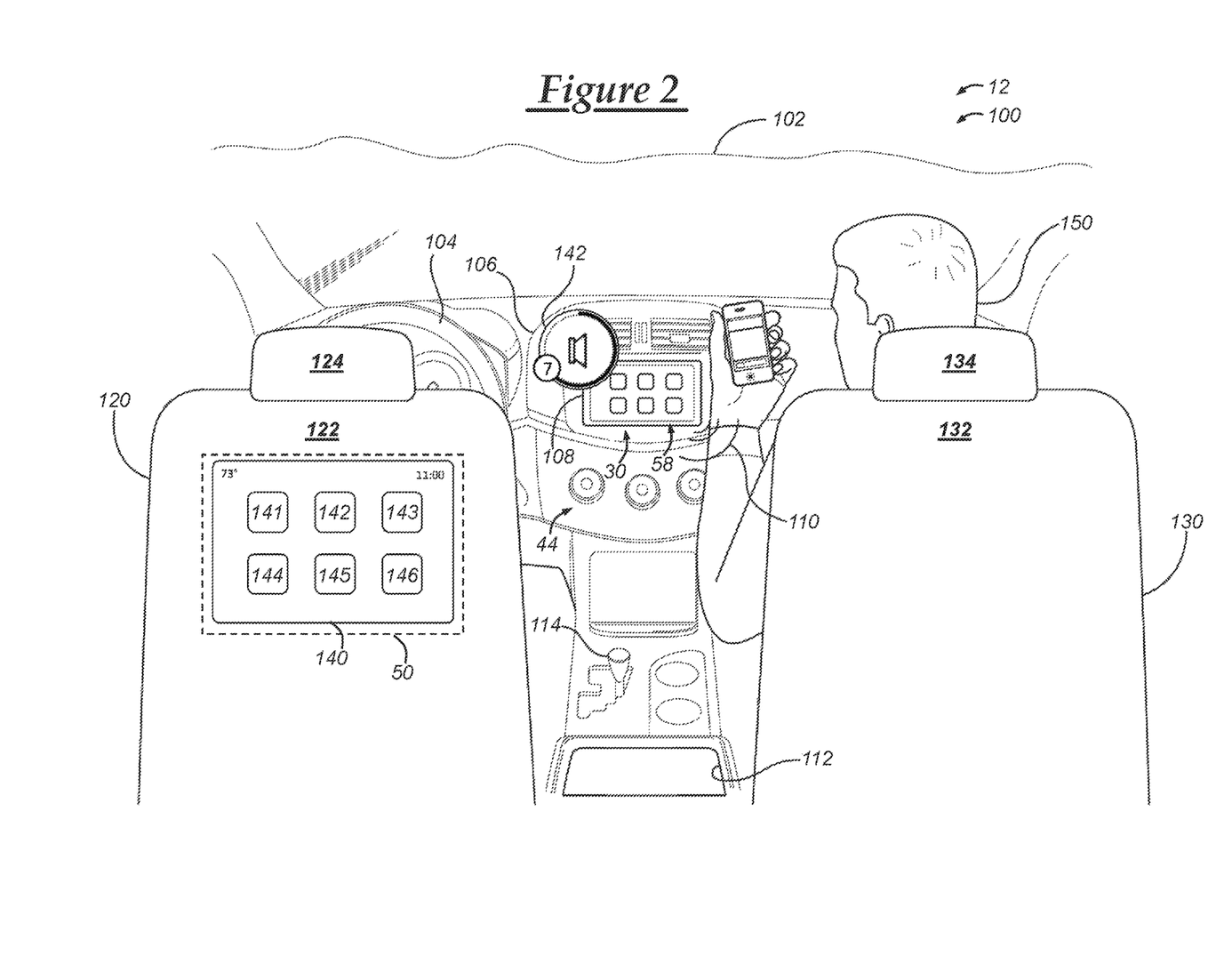
FIG. 2 is a perspective view depicting an embodiment of an interior of a vehicle.

With reference to FIG. 2, there is shown an interior 100 of a vehicle 12 from the perspective of a passenger in the back row of seats looking forward through windshield 102 using an AR/VR device, such as smartphone 14 or AR/VR goggles 16. The vehicle interior 100 includes the windshield 102, steering wheel 104, center console or instrument panel 106 that holds touchscreen display 58 and wireless communications device 30, a touchscreen user interface 108 displayed on touchscreen 58, storage compartment 112, a shifter 114, seats 120 and 130, and capacitive touch sensor array 50. Wireless communications device 30 communicate with AR/VR devices within or near vehicle interior 100, as shown by wireless signals 110. Also, the AR/VR devices 14,16 can present virtual vehicle control graphics 140,142 over a particular vehicle component, such as the backside 122 of driver seat 120 or capacitive touch sensor array 50.

As shown in the illustrated embodiment, virtual vehicle control graphics 140 can be displayed over the capacitive touch sensor array 50. By displaying the virtual vehicle control graphics over a touch-based input device, such as capacitive touch sensor array 50, the user of the AR/VR device can interact with the virtual vehicle control graphics via touching the touch-based input device to control or configure settings or carry out actions of the vehicle. The virtual vehicle control graphics 140 can include menu items 141-146, as well as information 150. In other embodiments, the capacitive touch sensor array 50 can be included in other parts of the vehicle, such as at or near components 102-130, and, in some embodiments, the vehicle can include a plurality of capacitive touch sensor arrays 50, such as one within the backside of each front-row vehicle seat. In other embodiments, other touch sensor arrays (including resistance touch sensor arrays) and/or other input mechanisms can be included and distributed throughout the vehicle interior 100.

Other virtual vehicle control graphics 142 can be displayed in different regions of the AR/VR device's field of view, including over a relevant input device of the vehicle. For example, virtual vehicle control graphics 142 show the present volume level of the audio system and the virtual vehicle control graphics 142 are shown above the touchscreen display 58, which can be used to control the multimedia vehicle controls including audio output levels.

With reference to FIG. 3, there is shown a method 200 of operating a vehicle using virtual vehicle controls. Method 200 can be carried out by an AR/VR device, such as smartphone 14 or AR/VR goggles 16. In one embodiment, the method 200 (or parts of this method) can be implemented in a computer program (or "application") embodied in a computer readable medium and including instructions usable by one or more processors of one or more computers of one or more systems, such as the processor of the AR/VR device 14,16. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another The program(s) can be embodied on computer readable media (such as memory that is a part of the AR/VR device), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method. Additionally, the corollary of method 200, which is a method corresponding to method 200 but from the vehicle-side, can be embodied on computer readable media, such as memory 38 of wireless communications device 30 and according to the one or more features discussed above with resepect to method 200.

Method 200 begins with step 210, wherein a connection is established between the vehicle and an AR/VR device 16. A connection between the AR/VR device and the vehicle can be carried out via SRWC or via wired connectors. In the case of establishing a connection using a wired connection, a user can plug a cord or cable, such as a USB cable, into a corresponding port included within the vehicle, such as a USB port near center console 106, and within the AR/VR device. In other embodiments, where a SRWC connection is established, the vehicle can send out a beacon or advertisement using SRWC circuit 32. The advertisement can be the same message as a virtual vehicle control graphics advertisement, or may be a separate message. The connection advertisement message can include data indicating that the vehicle desires to or can connect with an AR/VR device, or that the vehicle can offer virtual vehicle control graphics services. This message can then be received by the AR/VR device, which can then generate a response thereto, such as a message that initiates a four-way handshake or other authentication and/or shared key/secret establishment process. In other embodiments, the AR/VR device can transmit an advertisement or beacon message indicating to those SRWC devices within range that the AR/VR device is searching for devices that can provide virtual vehicle control graphics services. Once the connection is established, the AR/VR device may send the virtual vehicle control graphics request (step 230) via the established connection. In some embodiments, there may need to be no initial communications before the virtual vehicle control graphics is sent (step 230) and, this virtual vehicle control graphics request may be the initial message between the two devices. Once the connection is established the method 200 continues to step 220.

In step 220, the AR/VR device is used to capture images or video using a camera. The camera can be included as a part of the AR/VR device, or may be located as a part of an AR/VR assembly at the user, such as a headset AR/VR assembly. The camera can be used to capture images or video and, then, the AR/VR device can present the captured images or video on a display of the AR/VR device. The captured images or video can be immediately displayed on the display of the AR/VR device, or may be stored in memory for future display or other use. The method 200 continues to step 230.

In step 230, a virtual vehicle control graphics request is sent to the vehicle from the AR/VR device. The virtual vehicle control graphics request is a request for virtual vehicle control graphics. The virtual vehicle control graphics request can include user credentials, such as a username/password pair or an authorized token (i.e., a token that carries authorization related to virtual vehicle control graphics). In other embodiments, the credentials can be included as part of the initial connection establishment process (step 210). The virtual vehicle control graphics request can also include AR/VR device information, which can include make and/or model of device, device processing attributes or capabilities, device output display information, and version number of the device and of the various components of the device. Additionally, the virtual vehicle control graphics request can include information pertaining to the virtual vehicle control graphics, including a vehicle control graphics identifier that identifies particular virtual vehicle control graphics that can be used for presentation at the AR/VR device. The method 200 continues to step 240.

In step 240, a virtual vehicle control graphics response is received. The virtual vehicle control graphics response can be generated at the vehicle and in response to the virtual vehicle control graphics request that was sent by the AR/VR device (step 230). In one embodiment, the vehicle 12 can receive the virtual vehicle control graphics request via the established SRWC connection and, once received, the vehicle 12 can verify the user credentials of the AR/VR device or user. After the AR/VR device or user is determined to be authorized for use of virtual vehicle control graphics, the vehicle can process the virtual vehicle control graphics request and, then, generate the virtual vehicle control graphics response.

In one embodiment, the virtual vehicle control graphics response includes virtual vehicle control graphics that can be used for display on the display of the AR/VR device 16. The virtual vehicle control graphics can be selected for the virtual vehicle control graphics response based on information contained within the virtual vehicle control graphics request, such as the vehicle control graphics identifier. For example, the virtual vehicle control graphics request can include information (e.g., the vehicle control graphics identifier) indicating that the AR/VR device requests a particular user interface, such as a home screen of a vehicle controls or infotainment module. Additionally, or alternatively, the virtual vehicle control graphics response can include display information for the virtual vehicle control graphics, such as designated vehicle component information, designated graphics location information, and/or other information that can be used to locate a location of the virtual vehicle control graphics. The virtual vehicle control graphics can be stored in memory and/or displayed on the display of the AR/VR device and in a designated region. The method 200 continues to step 250.

In step 250, the virtual vehicle control graphics are presented on a display of the AR/VR device. The AR/VR device 16 can determine a display location on the display in which the virtual vehicle control graphics should be or are to be displayed. This determination can be made based on information contained within the virtual vehicle control graphics response, such as the designated vehicle component information or the designated graphics location information. The designated vehicle component information is information that designates a particular component of the vehicle (whether by name, reference identifier, etc.) as being the component that the virtual vehicle control graphics should be presented upon, or as a reference component that is used as a reference in locating the display location of the virtual vehicle control graphics. The designated graphics location information can include various information that can be used to locate the display location of the virtual vehicle control graphics. The graphics can be rendered over the captured images or video and, as the user moves the AR/VR device, the graphics can be updated along with the captured images or video such that the virtual vehicle control graphics appear to be part of the vehicle interior 100. The method 200 proceeds to step 260.

In step 260, vehicle control input can be received. In one embodiment, the vehicle control input can be received at the AR/VR device and, in other embodiments, the vehicle control input can be received at the vehicle. Furthermore, in some embodiments, the vehicle control input can be received at both the AR/VR device and the vehicle. The vehicle control input can be input information that is used to control a vehicle function, that is used to navigate a user interface, or that is used to carry out vehicle-device functionality. Various mechanisms can be used for receiving the vehicle control input, as discussed below.

In one embodiment, the vehicle control input can be received through use of detected user gestures or through user speech. For example, the AR/VR device can use the camera to capture images and/or video of the user including the user's hands or arms and, thereafter, the AR/VR device can determine one or more vehicle control inputs based on detected motion and/or position of the user. The AR/VR device can use processing techniques, such as image recognition and/or object recognition techniques, to determine information being conveyed by the user. In one instance, a user can rotate their hand and forearm in a clockwise manner to increase the volume of the multimedia vehicle audio system 54, as represented by graphic 142 in FIG. 2. In another example, the user can shake their head from front-to-back and/or side-to-side. The AR/VR device can detect that a direction that the user is moving their head based on the motion of the AR/VR device camera field of view. Various motions can be used to navigate user interface menus and/or select various vehicle settings or options. In yet another example, the AR/VR device can include a microphone that is configured to receive user speech. The user speech can be processed at the AR/VR device using speech processing techniques, or the user speech may be sent to a remote server (or the vehicle) for speech processing.

In other embodiments, the vehicle control input can be received through use of vehicle system modules (VSMs) including capacitive touch sensor array 50, pushbutton(s) 52, microphone 56, and/or touchscreen display 58. For example, the user may communicate via user speech that can be received by microphone 56. Or, the user may provide input via pressing a pushbutton 52, as well as touching a touchscreen display 58.

In other embodiments, the capacitive touch sensor array 50 can be used to receive the vehicle control input. The capacitive touch sensor array can be installed in various locations of the vehicle, as mentioned above, including the backside 122 of a passenger or driver seat 120 as shown in FIG. 2. The capacitive touch sensor array can detect when a user touches an area of the array and, additionally, the capacitive touch sensor array can detect motion of a user's finger (or other body part) along the capacitive touch sensor array 50. The capacitive touch sensor can be configured to send this user input to another VSM (such as wireless communications device 30 or BCM 24), which can then determine a vehicle control input that is being conveyed by the user. In another embodiment, the vehicle 12 may have informed the AR/VR device 16 to present the virtual vehicle control graphics at a particular display location on the AR/VR device display and, thus, the vehicle can determine which controls the user is attempting to control based on the location of the user's touch on the capacitive touch sensor array 50 in conjunction with the location of certain adjustable or interactive controls within the virtual vehicle control graphics, such as those menu control items 141-146 of virtual vehicle control graphics 140 (FIG. 2). The method 200 continues to step 270.

In step 270, the vehicle control input is sent to the vehicle. The vehicle control input can be sent to the wireless communications device 30 of vehicle 12 via the established connection, or to another vehicle module via a wired connection. The vehicle control input can be saved to memory of the AR/VR device for later use, such as for carrying out step 280. The method 200 continues to step 280.

In step 280, the virtual vehicle control graphics are updated to correspond to the vehicle control input and a vehicle response that occurs in response to the vehicle control input. In one embodiment, the virtual vehicle control graphics can be updated based on vehicle control input received at the AR/VR device, such as in step 260. Alternatively, or additionally, the virtual vehicle control graphics can be updated based on information received from a vehicle control input response, which is a response generated by the vehicle based on the vehicle control input. For example, a user may motion their forearm and hand in a clockwise direction (the vehicle control input) and this may result in an increase of the audio volume, which can be reflected using virtual vehicle control graphics 142 (FIG. 2). The vehicle control input can be received at the AR/VR device and, then, the AR/VR device can send this vehicle control input to the vehicle via the established connection. Additionally, the AR/VR device can depict the virtual vehicle control graphics that reflect an increase in the volume, such as depicting a volume level of "8" in the virtual vehicle control graphics 142 (FIG. 2).

In other embodiments, the AR/VR device can receive a vehicle control input response from the vehicle that is generated in response to the vehicle control input. This vehicle control input response can be generated and sent to the AR/VR device in response to the vehicle receiving the vehicle control input from the AR/VR device or via one or more vehicle-user interfaces. The vehicle control input response can include updated virtual vehicle control graphics that are to be displayed by the AR/VR device and that reflect an update of the vehicle controls, which is effected by the vehicle pursuant to the vehicle control input. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of operating a vehicle using virtual vehicle controls, wherein the method comprises:
    establishing a SRWC connection between an augmented reality/virtual reality (AR/VR) device and a wireless communications device included in vehicle electronics of a vehicle using short-range wireless communications (SRWC);
    capturing image or video data from an area within an interior of the vehicle;
    sending a virtual vehicle control graphics request to the vehicle via the established SRWC connection;
    receiving a virtual vehicle control graphics response from the vehicle via the established SRWC connection, wherein the virtual vehicle control graphics response includes virtual vehicle control graphics;
    presenting the captured image or video data and the virtual vehicle control graphics on a display of the AR/VR device such that the virtual vehicle control graphics are presented over the captured image or video data, wherein the virtual vehicle control graphics includes one or more vehicle-user interface components;
    receiving vehicle control input from a user at the AR/VR device, wherein the vehicle control input indicates a selection or modification of the one or more vehicle-user interface components, wherein the vehicle control input is initially received at a camera of the AR/VR device, and wherein the vehicle control input is communicated by the user to the AR/VR device via one or more gestures created by the user in a field of view of the camera; and
    sending the vehicle control input to the vehicle via the established SRWC connection, wherein the vehicle is configured to carry out one or more actions based on the vehicle control input.

2. The method of claim 1, wherein the captured image or video data is captured by the camera located on the AR/VR device, and wherein the camera of the AR/VR device faces an area in front of a user when the display of the AR/VR device is positioned to face the user.

3. The method of claim 2, wherein the AR/VR device is a pair of AR/VR goggles configured for visually presenting augmented reality or virtual reality media content to a user and that are wearable by the user and, when the AR/VR device is worn properly by the user, the display of the AR/VR device faces the user and the camera of the AR/VR device captures an area in front of the user.

4. The method of claim 1, further comprising the step of receiving a virtual vehicle control graphics advertisement that indicates virtual vehicle control graphics are available for use by the AR/VR device.

5. The method of claim 1, wherein the SRWC connection is established using BLUETOOTH, WI-FI, or other IEEE 802.11 technology.

6. The method of claim 1, wherein the virtual vehicle control graphics response includes virtual vehicle control graphics location information that indicates a vehicle component that the virtual vehicle control graphics are to be displayed on or that indicates a location on the display of the AR/VR device where the virtual vehicle control graphics are to be displayed.

7. The method of claim 1, further comprising the steps of:
    receiving a second virtual vehicle control graphics response from the vehicle after sending the vehicle control input to the vehicle, and wherein the second virtual vehicle control graphics includes updated virtual vehicle control graphics; and
    presenting the updated virtual vehicle control graphics on the display of the AR/VR device.

8. The method of claim 1, wherein the virtual vehicle control graphics are updated based on the vehicle control input.

9. The method of claim 1, wherein the vehicle control input is received at the vehicle from the AR/VR device.

10. The method of claim 9, wherein the vehicle control input is initially received at the AR/VR device using a controller of the AR/VR device.

11. The method of claim 9, further comprising the step of authorizing the vehicle control input based on authorization information contained within the vehicle control input and/or information contained in the virtual vehicle control graphics request.

12. A method of controlling a vehicle using virtual vehicle controls, wherein the method comprises:
    establishing a short-range wireless communications (SRWC) connection to an augmented reality/virtual reality (AR/VR) device, wherein the AR/VR device includes a display and a camera, wherein the AR/VR device is configured to capture image or video data, and wherein the AR/VR device includes short-range wireless communication (SRWC) circuitry that is used to send and receive SRWC signals, wherein the AR/VR device is separate from vehicle electronics of the vehicle;
    receiving a virtual vehicle control graphics request from the AR/VR device;
    determining whether the AR/VR device is authorized and/or authenticated for receiving and/or using virtual vehicle control graphics;
    sending virtual vehicle control graphics response to the AR/VR device via the established SRWC connection, wherein the AR/VR device is further configured to present the virtual vehicle control graphics on the display of the AR/VR device such that the virtual vehicle control graphics are presented over the captured image or video data, wherein the at least one of the virtual vehicle control graphics is presented on a display of the AR/VR device over the captured image or video data, wherein the at least one virtual vehicle control graphic is located within the display of the AR/VR device at a location that corresponds to a location within a cabin of the vehicle in which a capacitive touch sensor array of the vehicle is provided, and wherein the capacitive touch sensor array is included as a part of the vehicle electronics of the vehicle;
    receiving vehicle control input from a user of the AR/VR device, wherein the receiving step further includes receiving sensor location input from the capacitive touch sensor array, and wherein the sensor location input indicates a location within the capacitive touch sensor array that is touched by the user;
    determining a vehicle action to be carried out based on the sensor location input and the virtual vehicle control graphics; and
    carrying out the vehicle action at the vehicle.

13. The method of claim 12, wherein the virtual vehicle control graphics response includes virtual vehicle control graphics location information that indicates a vehicle component that the virtual vehicle control graphics are to be displayed on or that indicates a location within the display of the AR/VR device where the virtual vehicle control graphics are to be displayed.

14. The method of claim 12, wherein the vehicle control input indicates a selection or modification of the one or more vehicle-user interface components, and wherein the selection or modification is determined based on the sensor location input.

15. The method of claim 12, further comprising the step of modifying operation of one or more vehicle system modules (VSMs) in response to receiving the vehicle control input and wherein the modifying step is based on the vehicle control input.

16. The method of claim 15, further comprising the step of, after modifying operation of one or more vehicle system modules (VSMs), sending a vehicle control input response that includes information used for rendering updated virtual vehicle control graphics.

17. The method of claim 16, wherein the information used for rendering the updated virtual vehicle control graphics includes an instance of the updated virtual vehicle control graphics, and wherein the updated virtual vehicle control graphics are generated at the vehicle based on the vehicle control input and/or the modified operation of the one or more VSMs.

* * * * *